United States Patent
Izumi et al.

(10) Patent No.: US 11,419,352 B2
(45) Date of Patent: *Aug. 23, 2022

(54) BEVERAGE, METHOD FOR PRODUCING BEVERAGE, AND METHOD FOR SUPPRESSING FOAMING OF BEVERAGE

(71) Applicant: SUNTORY HOLDINGS LIMITED, Osaka (JP)

(72) Inventors: Akiko Izumi, Kanagawa (JP); Soichiro Urai, Kanagawa (JP); Tomoyuki Nishibori, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 252 days.

This patent is subject to a terminal disclaimer.

(21) Appl. No.: 15/541,164

(22) PCT Filed: Oct. 13, 2016

(86) PCT No.: PCT/JP2016/080413
§ 371 (c)(1),
(2) Date: Jun. 30, 2017

(87) PCT Pub. No.: WO2017/119169
PCT Pub. Date: Jul. 13, 2017

(65) Prior Publication Data
US 2018/0000133 A1    Jan. 4, 2018

(30) Foreign Application Priority Data
Jan. 5, 2016  (JP) ................. 2016-000578

(51) Int. Cl.
*A23L 2/60*   (2006.01)
*A23L 2/00*   (2006.01)
(Continued)

(52) U.S. Cl.
CPC ............. *A23L 2/60* (2013.01); *A23L 2/00* (2013.01); *A23L 27/00* (2016.08); *A23L 27/36* (2016.08)

(58) Field of Classification Search
CPC ... A23L 2/00; A23L 2/60; A23L 27/36; A23L 27/00
(Continued)

(56) References Cited

U.S. PATENT DOCUMENTS

| | | | |
|---|---|---|---|
| 4,612,942 | A | 9/1986 | Dobberstein et al. |
| 8,029,846 | B2 | 10/2011 | Talebi et al. |

(Continued)

FOREIGN PATENT DOCUMENTS

| | | |
|---|---|---|
| EP | 2 510 800 | 10/2012 |
| JP | 2004-520073 | 7/2004 |

(Continued)

OTHER PUBLICATIONS

U.S. Appl. No. 15/515,319, filed Mar. 2017, Urai et al.*
(Continued)

*Primary Examiner* — Helen F Heggestad
(74) *Attorney, Agent, or Firm* — Greenblum & Bernstein, P.L.C.

(57) ABSTRACT

There are provided a beverage in which foaming is suppressed and a *stevia* extract is blended, and a method for producing the same. A beverage, wherein a total content of RebA and RebD and/or RebM is 1 to 15 in Brix in terms of sucrose, a content of RebD and/or RebM is 1 or more in Brix in terms of sucrose, and ((RebD and/or RebM)/RebA) is 0.35 or more in a mass ratio.

28 Claims, 6 Drawing Sheets

(51) Int. Cl.
    *A23L 27/00*     (2016.01)
    *A23L 27/30*     (2016.01)

(58) Field of Classification Search
    USPC .................................. 426/590, 329, 548
    See application file for complete search history.

(56) References Cited

U.S. PATENT DOCUMENTS

| | | | |
|---|---|---|---|
| 8,277,861 | B2 | 10/2012 | Chang et al. |
| 8,277,862 | B2 | 10/2012 | Lee et al. |
| 8,377,491 | B2 | 2/2013 | Prakash et al. |
| 8,512,789 | B2 | 8/2013 | Prakash et al. |
| 8,535,746 | B2 | 9/2013 | Chang et al. |
| 8,535,747 | B2 | 9/2013 | Lee et al. |
| 8,703,225 | B2 | 4/2014 | Morita et al. |
| 8,937,168 | B2 | 1/2015 | Evans et al. |
| 8,945,652 | B2 | 2/2015 | Prakash et al. |
| 8,962,058 | B2 | 2/2015 | Prakash et al. |
| 9,125,429 | B2 | 9/2015 | Prakash et al. |
| 9,131,718 | B2 | 9/2015 | Shi et al. |
| 9,149,051 | B2 | 10/2015 | Prakash et al. |
| 9,169,285 | B2 | 10/2015 | Prakash et al. |
| 9,173,425 | B2 | 11/2015 | Prakash et al. |
| 2007/0082106 | A1 | 4/2007 | Lee et al. |
| 2007/0116823 | A1 | 5/2007 | Prakash et al. |
| 2009/0162484 | A1 | 6/2009 | Bell et al. |
| 2009/0214753 | A1 | 8/2009 | Morita et al. |
| 2010/0112159 | A1 | 5/2010 | Abelyan et al. |
| 2011/0160311 | A1 | 6/2011 | Prakash et al. |
| 2013/0071521 | A1 | 3/2013 | Lee et al. |
| 2013/0337138 | A1 | 12/2013 | Purkayastha et al. |
| 2014/0017378 | A1 | 1/2014 | Purkayastha et al. |
| 2014/0099403 | A1* | 4/2014 | Prakash et al. |
| 2014/0342043 | A1† | 11/2014 | Bell |
| 2014/0342044 | A1 | 11/2014 | Bell et al. |
| 2014/0357588 | A1 | 12/2014 | Markosyan et al. |
| 2015/0216218 | A1* | 8/2015 | Prakash et al. |
| 2016/0128371 | A1 | 5/2016 | Purkayastha et al. |
| 2016/0192685 | A1 | 7/2016 | Markosyan et al. |
| 2016/0331011 | A1 | 11/2016 | Carlson et al. |
| 2017/0135389 | A1 | 5/2017 | Carlson et al. |
| 2017/0215458 | A1 | 8/2017 | Urai et al. |

FOREIGN PATENT DOCUMENTS

| | | |
|---|---|---|
| JP | 2008-228633 | 10/2008 |
| JP | 2009-517043 | 4/2009 |
| JP | 2010-521174 A | 6/2010 |
| JP | 2012-179015 | 9/2012 |
| JP | 2012-213341 | 11/2012 |
| JP | 2013-005786 A | 1/2013 |
| JP | 2014-087359 | 5/2014 |
| WO | 02/087359 | 11/2002 |
| WO | 2008/112966 A1 | 9/2008 |
| WO | 2010/146463 | 12/2010 |
| WO | 2013/096420 | 6/2013 |
| WO | 2013/176738 | 11/2013 |
| WO | 2014/186084 | 11/2014 |
| WO | 2014/186250 | 11/2014 |
| WO | 2014/193934 | 12/2014 |
| WO | 2015/006764 A8 | 1/2015 |

OTHER PUBLICATIONS

U.S. Appl. No. 15/647,707, filed Jul. 2017, Urai et al.*
Kelly, D. "What Constitutes a New Use of a Known Composition", 2005, Santa Clara High Technology Law Journal, vol. 11, pp. 318-345 (Year: 2005).*
Wikipedia, "Surface tension values", https://en.wikipedia.org/wiki/Surface-tension_values , pp. 1-3 (Year: 2020).*
Miquet et al. "How does the presence of stevia glycosides impact surface bubbles stability?" (Year: 2020).*
International Search Report issued in PCT/JP2016/080413 dated Dec. 27, 2016.
Written Opinion issued in PCT/JP2016/080413 dated Dec. 27, 2016.
European Search Report issued with respect to Application No. 15846331.5, dated Oct. 4, 2017.
U.S. Appl. No. 15/647,707 to Soichiro Urai et al., filed Jul. 12, 2017.
European Search Report issued with respect to Application No. 16880172.8, dated Jan. 3, 2018.
Opposition filed against Japanese Patent No. 6109437 B on Oct. 6, 2017, along with a courtesy copy English-language translation of the claims of the corresponding Japanese patent.
Notification of Reasons for Revocation issued in Japanese Patent No. 6,109,437 B, dated Dec. 21, 2017, along with an English-language translation.
Notice of Opposition issued in Australian Patent Application No. 2015325329, dated Nov. 13, 2017.
International Search Report and Written Opinion issued in PCT/JP2015/077831, dated Dec. 15, 2015, along with an English language translation.
Hidetoshi Hamada, "Coca-cola Sha no Marketing ni Tsuite ~Seihin Goto no Aji no Chigai no Shiten kara~" H23 Kochi Univ. of Technology Management Gakubu Sotsugyo Ronbun Yoshi, Mar. 2012, [retrieval date Dec. 4, 2015]; Internet<URL:http://www.kochi-tech.ac.jp/library/ron/2011/2011man/a1120394.pdf>, along with a partial English language translation.
Kokuzeicho Shotei Bunsekiho (Showa 36 Nen Kokuzeicho Kunrei Dai 1 Go) (Heisei 19 Nen Kaisei), [on line], 2007, table 3, [retrieval date Jul. 2, 2015], Internet<URL: https://www.nta.go.jp/shiraberu/zeiho-kaishaku/tsutatsu/kobetsu/sonota/070622/pdf/fl03.pdf>, along with a partial English language translation.
Japanese Office Action issued JP Patent App. No. 2016-552142, dated Dec. 22, 2016, along with an English language translation.
Prakash et al., "Development of Next Generation Stevia Sweetener: Rebaudioside M" *Foods* 3:162-175, 2014.
Communication pursuant to Rule 114(2) EPC for EP App. No. 16880172.8, dated Aug. 30, 2019.
Office Action for JP App No. 2020-119358, dated Apr. 22, 2021 (w/ translation).
Prakash et al., "Isolation and Characterization of a Novel Rebaudioside M Isomer from a Bioconversion Reaction of Rebaudioside A and NMR Comparison Studies of Rebaudioside M Isolated from *Stevia rebaudiana* Bertoni and *Stevia rebaudiana* Morita", Biomolecules 2014, 4:374-389.
European Search Report for EP App. No. 20159916.4, dated Jun. 9, 2020.
Author, Indra Prakash; Title, Development of Next Generation Sweetener: Rebaudioside M; pages, 162-175;Publication date, Feb. 27, 2014; Journal, Food, vol. 3.†

* cited by examiner
† cited by third party

BEVERAGE, METHOD FOR PRODUCING BEVERAGE, AND METHOD FOR SUPPRESSING FOAMING OF BEVERAGE

TECHNICAL FIELD

Embodiments of the present invention relate to a beverage, a method for producing a beverage, and a method for suppressing the foaming of a beverage.

BACKGROUND ART

In order to address diversifying consumer needs, various beverages are developed and commercially available. Saccharides such as sucrose are components extremely ordinarily blended in beverages for the purposes of giving sweetness, and the like, but the influence of excess intake on health has been pointed out, and there are needs for low calorie beverages. And needs for naturally derived materials are increasing. In order to meet these needs, naturally derived sweeteners having a high degree of sweetness compared with saccharides are attracting attention. Patent Literature 1 discloses a functional sweetener composition containing a vitamin, a high intensity sweetener, and a sweetness-improving composition.

CITATION LIST

Patent Literature

Patent Literature 1: Japanese Patent Domestic Announcement No. 2009-517043

SUMMARY OF INVENTION

Technical Problem

The inventor of this application has conducted a study on the use of natural sweeteners in beverages and has found that when a *stevia* extract is blended in a beverage, foaming intensifies. As natural sweeteners, Stevioside, Rebaudioside (hereinafter referred to as "Reb"), and the like as the sweet components of *stevia* extracts are known, and the details will be described later.

It is an object of the embodiment of the present invention to provide a beverage in which foaming is suppressed and a *stevia* extract is blended, and a method for producing the same.

Solution to Problem

The embodiment of the present invention provides a beverage, wherein a total content of RebA and RebD and/or RebM is 1 to 15 in Brix in terms of sucrose, a content of RebD and/or RebM is 1 or more in Brix in terms of sucrose, and ((RebD and/or RebM)/RebA) is 0.35 or more in a mass ratio, though not limited.

DESCRIPTION OF EMBODIMENT

Figure 1:
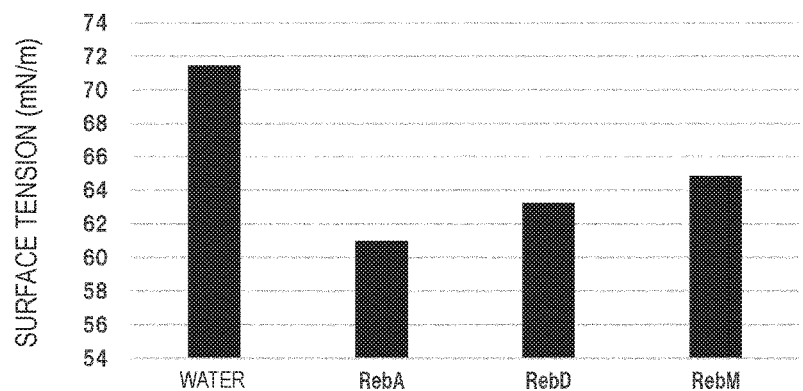
FIG. 1 shows the surface tension of aqueous solutions of *stevia* extracts.

A beverage according to the embodiment of the present invention will be described below with reference to the drawings.

The beverage in the embodiment of the present invention is a beverage, wherein the total content of RebA and RebD and/or RebM is 1 to 15 in Brix in terms of sucrose, the content of RebD and/or RebM is 1 or more in Brix in terms of sucrose, and ((RebD and/or RebM)/RebA) is 0.35 or more in a mass ratio.

Reb is known as a sweet component contained in a *stevia* extract. The *stevia* extract is obtained by extraction from *stevia* dry leaves and purification. A *stevia* is an Asteraceae perennial plant native to Paraguay in South America, and its scientific name is *Stevia Rebaudiana* Bertoni. The *stevia* comprises a component having about 300 times or more the sweetness of sugar and therefore is grown in order to extract this sweet component and use it as a natural sweetener. As Reb, RebA, RebB, RebC, RebD, and RebE are known. Further, recently, the presence of various glycosides such as RebM described in Japanese Patent Domestic Announcement No. 2012-504552 has been reported. Among various Reb, RebA is evaluated as a sweetener having a high degree of sweetness and good sweetness and widely used. In the embodiment of the present invention, as *stevia* extracts, RebA, RebD, and RebM attract attention. RebA, RebD, and RebM are available on the market and can also be synthesized by an organic chemical method. Alternatively, using a *stevia* extract as a starting raw material, RebA, RebD, and RebM can also be separated and purified. For example, RebA can be purified according to a method described in Japanese Patent Domestic Announcement No. 2009-517043, RebD can be purified according to a method described in U.S. Pat. No. 8,414,949, and RebM can be purified according to a method described in Foods 2014, 3(1), 162-175; doi: 10.3390/foods3010162. RebA, RebD, and RebM may be analyzed by any method and can be analyzed, for example, by a high performance liquid chromatography (HPLC) set under conditions described in Japanese Patent Domestic Announcement No. 2012-504552. RebA, RebD, and RebM are analyzed herein by the method, unless otherwise described.

Examples of the beverage include refreshing beverages, nonalcoholic beverages, and alcoholic beverages. The beverage may be a beverage comprising no carbonic acid gas and may be a beverage comprising carbonic acid gas. Examples of the beverage comprising no carbonic acid gas include, but are not limited to, tea beverages such as green tea, oolong tea, black tea, and barley tea, coffee, fruit juice beverages, milk beverages, and sports drinks. Examples of the beverage comprising carbonic acid gas include, but are not limited to, cola, diet cola, ginger ale, soda pop, and carbonated water provided with a fruit juice flavor.

The embodiment of the present invention relates to suppressing foaming by decreasing the content of RebA as a *stevia* extract in a beverage. The content of RebA in the beverage can be Brix 15 or less, preferably 13.5 or less, more preferably 11.5 or less, and further preferably 7.5 or less in terms of sucrose but is not limited to these. Alternatively, RebA may be contained in the beverage to the extent that even slight sweetness is felt, and may be contained in the beverage, for example, at Brix 0.015 or more, preferably 0.03 or more, and more preferably 0.5 or more in terms of sucrose.

The foaming suppression effect of RebD and RebM can be confirmed as follows. Here, surface tension known to those skilled in the art for being related to foaming was measured. Aqueous solutions in which RebA, RebD, and RebM (commercial products were used) were respectively blended were prepared. The amounts of RebA, RebD, and RebM blended were adjusted at Brix 10 in terms of sucrose (that is, 333 ppm of RebA, 351 ppm of RebD, and 351 ppm of RebM). The surface tension of the aqueous solutions prepared in this manner was measured. Water as a control was similarly tested. The surface tension of each aqueous solution was measured by a plate method using an automatic surface tensiometer (model CBVP-Z, Kyowa Interface Science Co., Ltd.). The aqueous solution containing RebD or RebM had high surface tension compared with the beverage containing RebA (FIG. 1). Each aqueous solution was foamed in a reduced pressure state and returned to the atmospheric conditions, and the time required for the bubbles to subside was measured. For the aqueous solution containing RebD or RebM, foaming subsided in roughly ½ the time for the beverage containing RebA. From these results, it was shown that for RebD and RebM, the surface tension of the beverage was increased compared with that for RebA.

When the content of RebA in a beverage is simply decreased as described above, sweetness derived from the *stevia* extract sometimes cannot be sufficiently given to the beverage. In other words, in the embodiment of the present invention, by replacing RebA as a *stevia* extract by RebD and/or RebM in a beverage, sweetness derived from the *stevia* extracts can be sufficiently given while the foaming of the beverage is suppressed. In the beverage in the embodiment of the present invention, the content of RebD and/or RebM can be an amount required as an alternative to RebA. The beverage can contain RebD and RebM singly or in combination. When the beverage contains RebD alone, the content of RebD is not limited and can be, for example, 15 or less in Brix in terms of sucrose and further may be 1 or more in Brix in terms of sucrose. When the beverage contains RebM alone, the content of RebM is not limited and can be, for example, 15 or less, preferably 11.5 or less, and more preferably 7.7 or less in Brix in terms of sucrose and further may be 1 or more in Brix in terms of sucrose. When the beverage contains RebD and RebM, the total amount of RebD and RebM can be, for example, 15 or less in Brix in terms of sucrose and further may be 1 or more in Brix in terms of sucrose.

Figure 2:
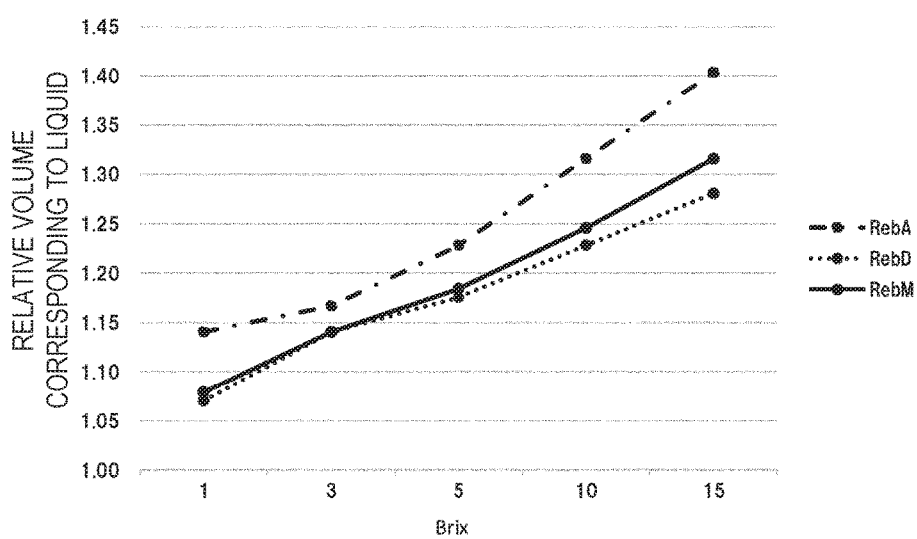
FIG. 2 shows the influence of the content of *stevia* extracts on the foaming of green tea beverages.
Figure 3:
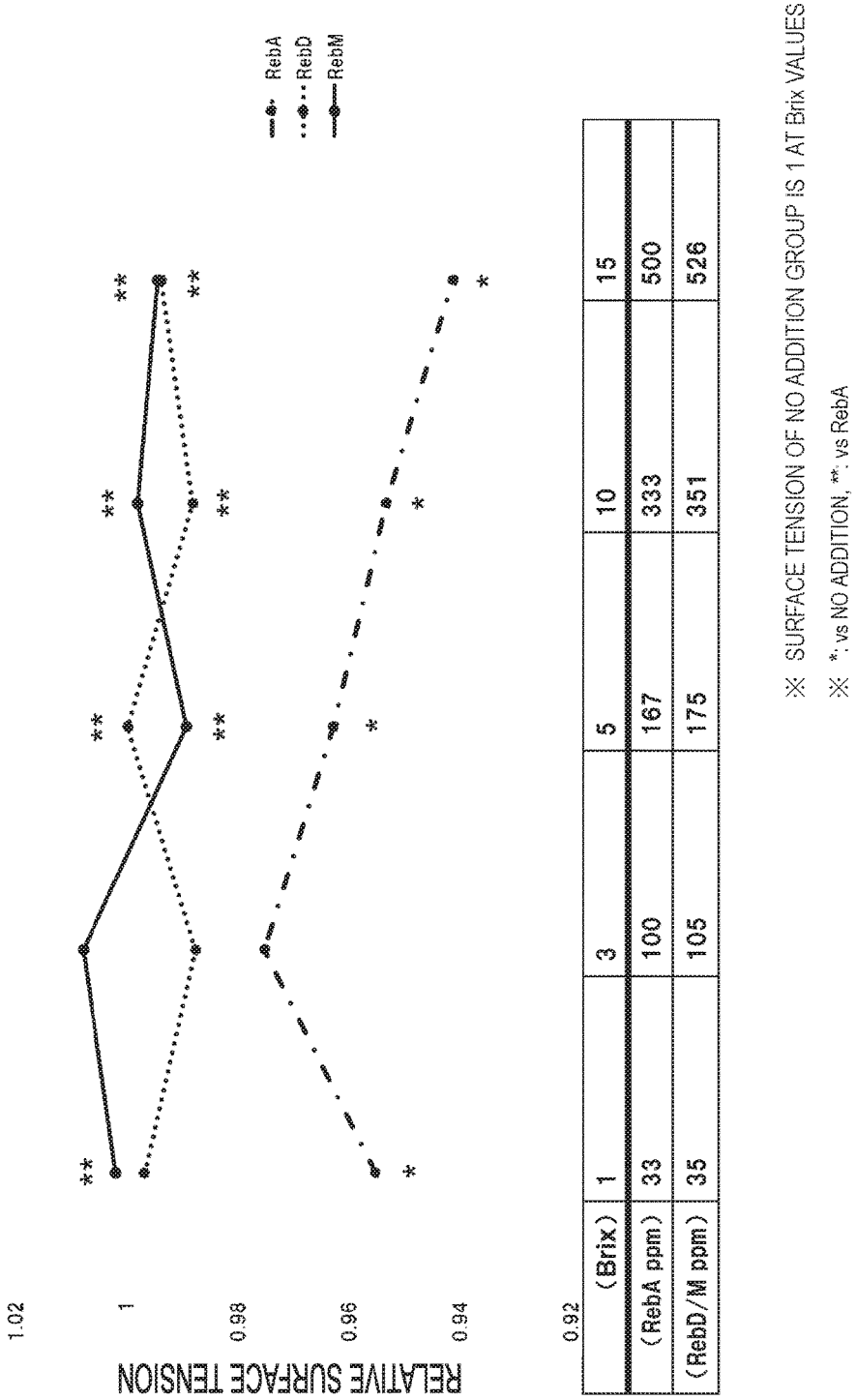
FIG. 3 shows changes in the surface tension of green tea beverages by the amounts of *stevia* extracts blended.
Figure 4:
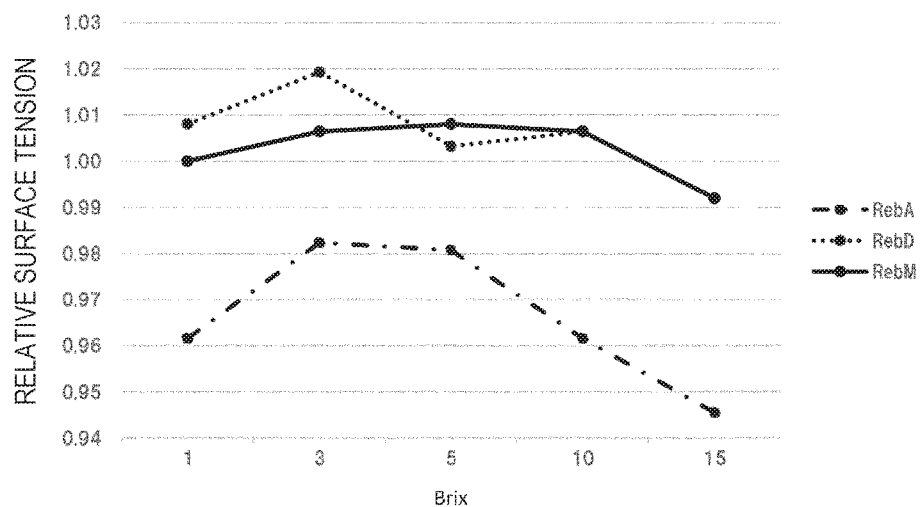
FIG. 4 shows changes in the surface tension of oolong tea beverages by the amounts of *stevia* extracts blended.
Figure 5:
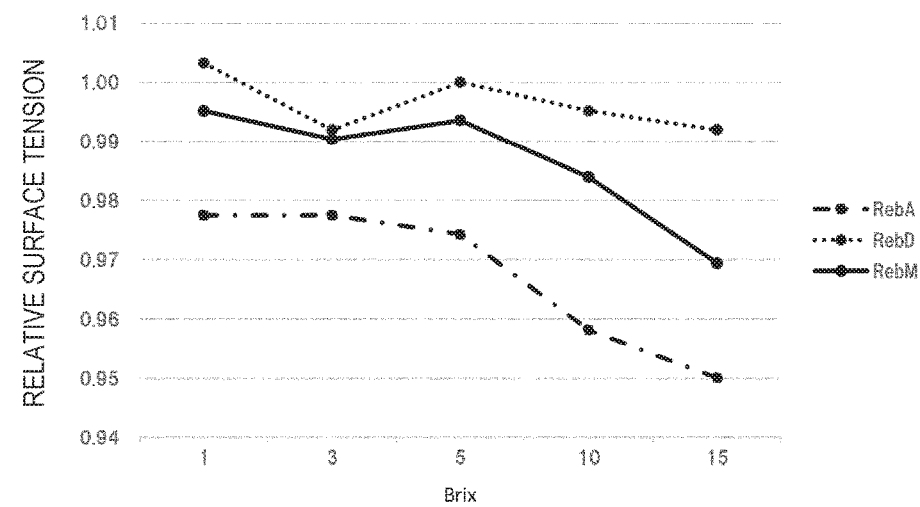
FIG. 5 shows changes in the surface tension of black tea beverages by the amounts of *stevia* extracts blended.
Figure 6:
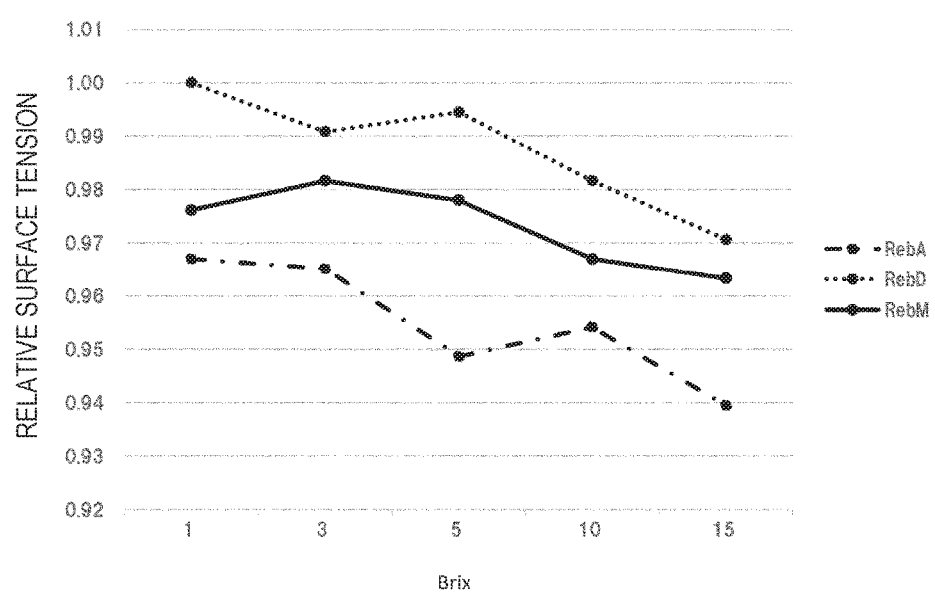
FIG. 6 shows changes in the surface tension of fruit juice beverages by the amounts of *stevia* extracts blended.

The influence of the content of RebD and RebM in the beverage on foaming can be confirmed as follows. RebA, RebD, and RebM were each blended in a green tea extract in the range of Brix 1 to 15 in terms of sucrose to prepare beverages. Each beverage was placed in a graduated cylinder having a volume of 200 mL and shaken by a shaker (yamato A300) at a speed of 300 times/min. The scale mark at the bubble rising surface was read and taken as the volume corresponding to bubble liquid level. The results are shown as relative values in which the bubble liquid level of a beverage to which none of RebA, RebD, and RebM is added is 1 (FIG. 2). For the beverages containing RebD or RebM, foaming was suppressed compared with that for the beverages containing RebA, in the whole range of amounts blended studied (1 to 15 in Brix in terms of sucrose). As another test, further, RebA, RebD, and RebM were each blended in a tea extract (green tea, oolong tea, or black tea) or an orange juice beverage in the range of Brix 1 to 15 in terms of sucrose to prepare beverages. The surface tension of the prepared beverages was measured. The measured values are shown as relative values in which the surface tension of a beverage to which none of RebA, RebD, and RebM is added is 1 at Brix values (FIG. 3: green tea beverages, FIG. 4: oolong tea beverages, FIG. 5: black tea beverages, FIG. 6: orange juice beverages). For all of the tea beverages (green tea, oolong tea, and black tea) and the orange juice beverages, the beverages containing RebD or RebM had high surface tension compared with the beverages containing RebA, in the whole range of amounts blended studied (1 to 15 in Brix in terms of sucrose). From these results, it is suggested that in order to maintain sweetness while suppressing the foaming of the beverage, RebD and RebM can replace RebA in amounts blended equivalent to 1 to 15 in Brix in terms of sucrose.

The total amount of RebA, RebD, and RebM in the beverage can be set in a required range and can be set in a range that is not a problem in terms of flavor. Alternatively, the total amount can also be set in a range required for a low calorie beverage. For example, although not limited, the total amount of RebA, RebD, and RebM in the beverage can be equivalent to Brix 1 to 15, preferably 1 to 13.5, more preferably 1 to 12, further preferably 1 to 11.5, and still more preferably 1 to 7.5 in terms of sucrose. When the total amount is less than Brix 1 in terms of sucrose, not only can sweetness derived from the *stevia* extracts not be sufficiently provided, but the bubble suppression effect of the replacement of RebA by RebD and/or RebM may not be sufficiently exerted. On the other hand, when the total amount is more than Brix 15 in terms of sucrose, the flavor of the beverage may worsen, and RebD may precipitate at low temperatures.

Here, Brix in terms of sucrose can be calculated from the degree of sweetness of Reb based on sucrose and the content of Reb. RebA has 300 times the sweetness of sucrose, RebD has 285 times the sweetness of sucrose, and RebM has 285 times the sweetness of sucrose. Therefore, the amount of Reb equivalent to Brix 1 in terms of sucrose can be calculated as 33.3 ppm for RebA and 35.1 ppm for RebD (also RebM).

The beverage may contain RebD and/or RebM and RebA at a particular mass ratio. For example, the ((RebD and/or RebM)/RebA) mass ratio can be, for example, 0.35 or more, preferably 1.1 or more, more preferably 2.5 or more, and further preferably 6.0 or more. When this ratio is less than 0.35, the influence of RebA is strong, and the foaming of the beverage sometimes cannot be suppressed.

Figure 7:
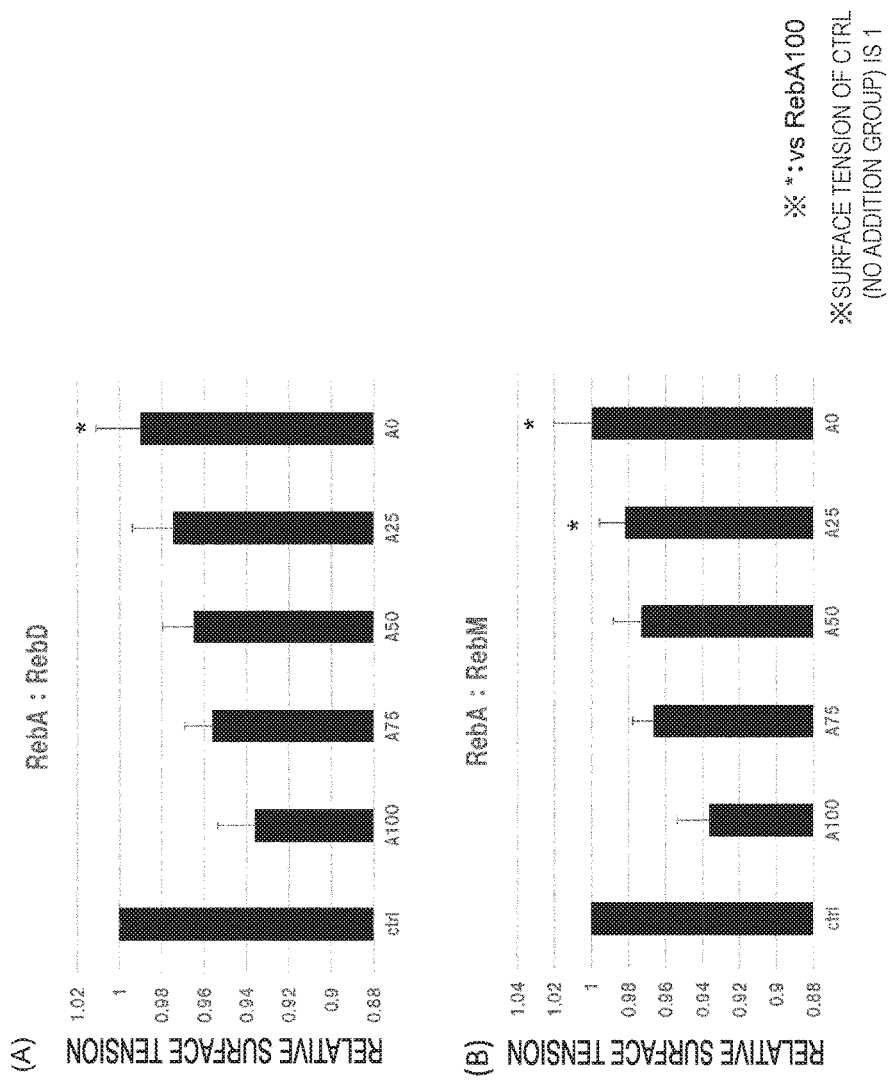
FIG. 7 shows changes in surface tension by the mass ratio of RebM and/or RebD to RebA.

The influence of the mass ratio of RebM and/or RebD to RebA on foaming can be confirmed as follows. RebA, RebD, and RebM were blended in green tea extracts to prepare beverages with Brix 10 in terms of sucrose. At this time, the blending proportion (%) of RebA and RebD was the following:

100:0 in a Brix ratio in terms of sucrose;
75:25 in a Brix ratio in terms of sucrose;
50:50 in a Brix ratio in terms of sucrose;

25:75 in a Brix ratio in terms of sucrose;
0:100 in a Brix ratio in terms of sucrose;
The blending proportion of RebA and RebM was also similar to the above. The surface tension of the green tea beverages was measured according to the method shown in the above. A green tea extract to which no RebA, RebD, or RebM was added, as a control (Ctrl), was similarly measured. The results are shown in FIG. 7. In the figure, the values represent relative values in which the surface tension of the control is 1, (A) shows the results for the beverages in which RebA and RebD are blended, and (B) shows the results for the beverages in which RebA and RebM are blended. A100 represents RebA:RebD (RebM)=100:0 (Brix ratio in terms of sucrose, the same applies hereinafter); A75 represents RebA:RebD (RebM)=75:25; A50 represents RebA:RebD (RebM)=50:50; A25 represents RebA:RebD (RebM)=25:75; and A0 represents RebA:RebD (RebM)=0:100. "*" represents a significant difference from A100. As the ratio of RebD to RebA increased, the surface tension of the green tea beverage tended to increase (FIG. 7 (A)). When RebA was all replaced by RebD, the surface tension of the green tea beverage was comparable to the surface tension of the control. Also when RebA was replaced by RebM, similar results were obtained. From these results, it was shown that by replacing RebA by RebD and/or RebM, the foaming of the beverage was suppressed without decreasing the degree of sweetness derived from the *stevia* extracts. It is suggested that the effect is achieved when ((RebD and/or RebM)/RebA) is 0.33 or more in a Brix ratio in terms of sucrose, that is, 0.35 or more in a mass ratio.

The beverage in the embodiment of the present invention can further contain sucrose. The content of sucrose can be appropriately set based on the properties, product concept, and the like of the target beverage and can be, for example, 6 to 12 g per 100 g of the beverage (equivalent to Brix 6 to 12) but is not limited to this. Further, the content of sucrose in the beverage can be set from the relationship between RebA, RebD, and RebM based on the degree of sweetness. For example, RebD and/or RebM to sucrose ((RebD and/or RebM)/sucrose) can be 0.43 or more, preferably 1 or more, and more preferably 2.3 or more in a Brix ratio in terms of sucrose.

The quantification of saccharides such as sucrose can be performed by a method well-known to those skilled in the art. For example, the quantification can be performed by high performance liquid chromatography (HPLC) set under the following conditions:
Equipment used: HP1100 system manufactured by HP
Column used: LiChrospher 100 $NH_2$ (5 μm) (4 mm×250 mm)
Mobile phase: acetonitrile:water=75:25
Flow rate: 1.0 mL/min
Column temperature: 40° C.
Injection volume: 10 μL
Detector: Sugar content differential refractometer (Shodex RI-71).
The quantification of saccharides such as sucrose is performed herein by the method, unless otherwise described.

Figure 8:
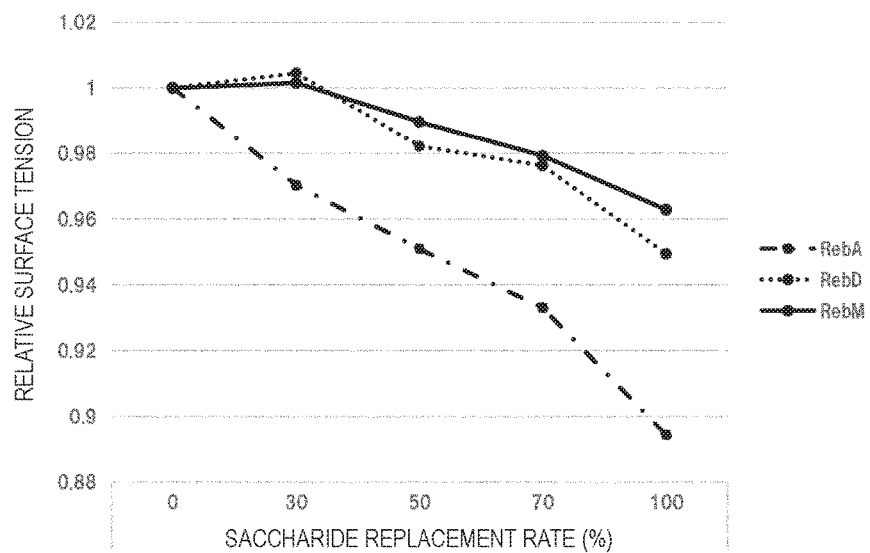
FIG. 8 shows changes in the surface tension of green tea beverages when sucrose in an amount equivalent to Brix 10 is replaced by RebA, RebD, and RebM.

The influence of the replacement of sucrose by *stevia* extracts (RebA, RebM, and RebD) on foaming can be confirmed as follows. RebA, RebD, and RebM were each blended in a green tea extract in combination with sucrose to prepare beverages with Brix 10 in terms of sucrose. At this time, the blending proportion (%) of sucrose and RebD was the following:
100:0 in a Brix ratio in terms of sucrose (saccharide replacement rate 0%);
70:30 in a Brix ratio in terms of sucrose (saccharide replacement rate 30%);
50:50 in a Brix ratio in terms of sucrose (saccharide replacement rate 50%);
30:70 in a Brix ratio in terms of sucrose (saccharide replacement rate 70%);
0:100 in a Brix ratio in terms of sucrose (saccharide replacement rate 100%);
The blending proportion of sucrose and RebA and the blending proportion of sucrose and RebM were also similar to the above. The surface tension of the beverages was measured as shown above. The results are shown in FIG. 8. It was shown that when sucrose was replaced by RebA, the surface tension of the beverage tended to decrease greatly. On the other hand, when sucrose was replaced by RebD, a decrease in the surface tension of the beverage was significantly suppressed compared with that for RebA. The results when sucrose was replaced by RebM were similar to those for RebD. From these results, it was suggested that by setting the ((RebD and/or RebM)/sucrose) Brix ratio in terms of sucrose at 0.43 or more, the surface tension was maintained without changing the degree of sweetness of the beverage. This suggests that by replacing sucrose by RebD and/or RebM, it is possible to provide a low calorie beverage in which foaming is suppressed and sweetness is maintained or enhanced.

Figure 9:
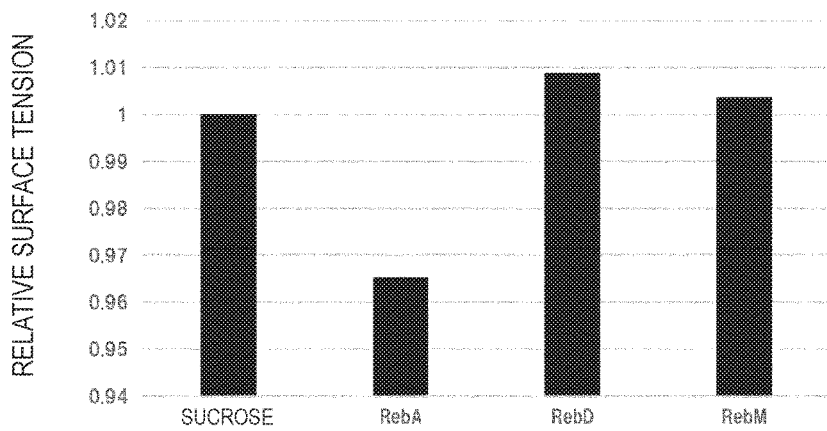
FIG. 9 shows changes in the surface tension of coffee beverages when sucrose in an amount equivalent to Brix 10 is replaced by RebA, RebD, and RebM.

Further, the influence of the replacement of sucrose by *stevia* extracts (RebA, RebM, and RebD) on foaming can also be confirmed as follows. RebA, RebD, and RebM were each blended in sugar-free coffee in combination with sucrose to prepare beverages with Brix 10 in terms of sucrose. At this time, the blending proportion (%) of sucrose and RebD was 30:70 in a Brix ratio in terms of sucrose. The blending proportion of sucrose and RebA and the blending proportion of sucrose and RebM were also similar to the above. In addition, a beverage in which only sucrose was blended was used as a control. The surface tension of the beverages was measured according to the method shown in the above. The results are shown in FIG. 9. In the figure, the values represent relative values in which the surface tension of the control ("sucrose") is 1. Even if sucrose was replaced by RebD for 70% of Brix 10 in terms of sucrose, there was no substantial change in the surface tension of the beverage. Also when sucrose was replaced by RebM, a similar result was obtained. On the other hand, when sucrose was replaced by RebA, the surface tension of the beverage decreased. From these results, it was suggested that sucrose could be replaced by RebD and/or RebM with the degree of sweetness of the beverage maintained and without foaming being influenced.

The beverage in the embodiment of the present invention may have a surface tension in a particular range. The surface tension of the beverage is, for example, 20 to 90 mN/m, preferably 30 to 80 mN/m, but is not limited to these.

The beverage in the embodiment of the present invention may further comprise components that can be used in foods and drinks, such as polyphenols such as catechins, extracts of plants, caffeine, cinnamaldehyde, caramel coloring, and sweeteners (saccharides such as sugar and isomerized liquid sugars, and high intensity sweeteners such as aspartame, sucralose, and acesulfame K), flavoring avents, acidulants (citric acid, tartaric acid, malic acid, phosphoric acid, and lactic acid), colorants, fruit juices, fruit juice purees, milk, milk products, other flavors, and nutrient supplements (vitamins, calcium, minerals, and amino acids). These components may be blended singly in the beverage, or a plurality of these components may be blended in combination in the beverage.

The beverage in the embodiment of the present invention can be filled into a container. For the container, a container of any form and material can be used, and, for example, the container may be a container such as a bottle, a can, a barrel, or a PET bottle. In addition, the method for filling the beverage into a container is also not particularly limited.

<Method for Producing Beverage>

According to another aspect of the embodiment of the present invention, a method for producing a beverage is provided.

The method for producing a beverage comprises the step of dissolving raw materials such as RebA, RebD, and RebM in water. The RebA content can be set so that the content of RebA in the beverage is Brix 15 or less, preferably 13.5 or less, more preferably 11.5 or less, and further preferably 7.5 or less in terms of sucrose, and substantially no RebA may be contained in the beverage, but these are not limiting. RebA may be contained in the beverage to the extent that even slight sweetness is felt. For example, the content of RebA may be set so that the content of RebA in the beverage is Brix 0.015 or more, preferably 0.03 or more, and more preferably 0.5 or more in terms of sucrose.

The content of RebD and/or RebM can be an amount required as an alternative to RebA. RebD and RebM can each be used alone or can be used in combination. When RebD is used alone, the content of RebD is not limited and can be set so that, for example, the content of RebD in the beverage is Brix 15 or less in terms of sucrose, and further may be Brix 1 or more in terms of sucrose. When RebM is contained alone in the beverage, the content of RebM is not limited and can be set so that, for example, the content of RebM in the beverage is Brix 15 or less, preferably 11.5 or less, and more preferably 7.7 or less in terms of sucrose, and further may be Brix 1 or more in terms of sucrose. When RebD and RebM are used in combination, the content of RebD and RebM can be set so that, for example, the content of RebD and RebM in the beverage is Brix 15 or less in terms of sucrose, and further may be Brix 1 or more in terms of sucrose.

By replacing RebA as a *stevia* extract by RebD and/or RebM, sweetness derived from the *stevia* extracts can be sufficiently given to a beverage while the problem of the foaming of the beverage is addressed. When RebD and RebM are used in combination, RebD and RebM may be combined at a particular ratio.

RebD and/or RebM and RebA may be used at a particular mass ratio. For example, the content of RebD and/or RebM and RebA can be set so that the ((RebD and/or RebM)/RebA) mass ratio in the beverage is, for example, 0.35 or more, preferably 1.1 or more, more preferably 2.5 or more, and further preferably 6.0 or more. When the ratio is less than 0.35, the influence of RebA is strong, and the foaming of the beverage sometimes cannot be suppressed.

The total amount of RebA, RebD, and RebM can be set in a range required for a beverage and can be set in a range required, for example, for a low calorie beverage. For example, although not limited, the content of RebD and/or RebM and RebA can be set so that the total amount of RebA, RebD, and RebM in the beverage is Brix 1 to 15, preferably 1 to 13.5, more preferably 1 to 12, further preferably 1 to 11.5, and still more preferably 1 to 7.5 in terms of sucrose. When the total amount is less than Brix 1 in terms of saccharide, not only can sweetness derived from the *stevia* extracts not be sufficiently provided, but the effect of suppressing the bubbles of the beverage may not be sufficiently exerted. On the other hand, when the total amount is more than Brix 15 in terms of sucrose, the flavor of the beverage may worsen, and RebD may precipitate at low temperatures.

Sucrose can be further blended in the beverage. The amount of sucrose blended can be appropriately set based on the properties, product concept, and the like of the target beverage. For example, sucrose can be blended in an amount such as 6 to 12 g per 100 g of the beverage (equivalent to Brix 6 to 12), but the amount of sucrose blended is not limited to this. Further, the amount of sucrose blended can be set from the relationship between RebA, RebD, and RebM based on the degree of sweetness. Sucrose can be blended so that RebD and/or RebM to sucrose ((RebD and/or RebM)/sucrose) is, for example, 0.43 or more, preferably 1 or more, and more preferably 2.3 or more in a Brix ratio in terms of sucrose.

Components that can be used in foods and drinks, such as polyphenols such as catechins, extracts of plants, caffeine, cinnamaldehyde, caramel coloring, sweeteners (saccharides such as sugar, glucose, fructose, and isomerized liquid sugars, and high intensity sweeteners such as aspartame, sucralose, and acesulfame K), flavoring agents, acidulants (citric acid, tartaric acid, malic acid, phosphoric acid, and lactic acid), colorants, fruit juices, fruit juice purees, milk, and milk products, other flavors, and nutrient supplements (vitamins, calcium, minerals, and amino acids) may be further blended in the beverage. These components may be blended singly, or a plurality of these components may be blended in combination.

The beverage produced by the method in the embodiment of the present invention may have a surface tension in a particular range. The surface tension of the beverage is, for example, 20 to 90 mN/m, preferably 30 to 80 mN/m, but is not limited to these.

The invention claimed is:

1. A beverage with suppressed foaming, comprising:
   Reb A,
   Reb M,
   a total content of RebA and RebM of 1 to 7.5 Brix in terms of sucrose,
   a content of RebM of 1 or more Brix in terms of sucrose,
   a mass ratio of RebM/RebA of 2.5 or more, and
   RebM/sucrose in a ratio of Brix in terms of sucrose of 0.43 or more,
   in a liquid;
   wherein the beverage has a surface tension of 20 to 90 mN/m.

2. The beverage according to claim 1, wherein a content of sucrose is Brix 6 to 12.

3. The beverage according to claim 2, wherein the mass ratio of RebM/RebA is 6.0 or more.

4. The beverage according to claim 1, wherein the mass ratio of RebM/RebA is 6.0 or more.

5. The beverage according to claim 1, wherein the liquid is water, coffee, tea, fruit juice, or milk.

6. A method for suppressing foaming of a beverage, comprising:
   adding RebA, RebM, and sucrose to a beverage so that:
   a total content of RebA and RebM is 1 to 7.5 Brix in terms of sucrose,
   a content of RebM is 1 or more Brix in terms of sucrose,
   a mass ratio of RebM/RebA is 2.5 or more,
   RebM/sucrose in a ratio of Brix in terms of sucrose is 0.43 or more, and
   the beverage has a surface tension of 20 to 90 mN/m.

7. The method according to claim 6, comprising adding the sucrose so that a content of sucrose is Brix 6 to 12 in the beverage.

8. The method according to claim 7, wherein the mass ratio of RebM/RebA is 6.0 or more.

9. The method according to claim 6, wherein the mass ratio of RebM/RebA is 6.0 or more.

10. A beverage with suppressed foaming, consisting essentially of:
Reb A,
Reb M,
a total content of RebA and RebM of 1 to 7.5 Brix in terms of sucrose,
a content of RebM of 1 or more Brix in terms of sucrose,
a mass ratio of RebM/RebA of 2.5 or more,
RebM/sucrose in a ratio of Brix in terms of sucrose of 0.43 or more, and
one or more ingredients selected from polyphenols, caffeine, cinnamaldehyde, caramel coloring, additional sweeteners, alcohol, flavoring agents, acidulants, colorants, fruit juice purees, milk products, and nutrient supplements,
in a liquid,
wherein the beverage has a surface tension of 20 to 90 mN/m.

11. The beverage according to claim 10, wherein the liquid is water, coffee, tea, fruit juice, or milk.

12. The beverage according to claim 10, wherein the beverage is a nonalcoholic beverage.

13. The beverage according to claim 10, wherein the beverage is an alcoholic beverage.

14. The beverage according to claim 10, wherein the beverage is a tea beverage, coffee beverage, fruit juice beverage, milk beverage, sports drink, cola, ginger ale, soda pop, or carbonated water provided with a fruit juice flavor.

15. The beverage according to claim 10, wherein the additional sweeteners are selected from aspartame, sucralose, and acesulfame K.

16. The beverage according to claim 10, wherein the acidulants are selected from citric acid, tartaric acid, malic acid, phosphoric acid, and lactic acid.

17. The beverage according to claim 10, wherein the nutrient supplements are selected from vitamins, minerals, and amino acids.

18. The beverage according to claim 10, wherein the one or more ingredients includes at least calcium.

19. A beverage with suppressed foaming, consisting essentially of:
Reb A,
Reb M,
a total content of RebA and RebM of 1 to 7.5 Brix in terms of sucrose,
a content of RebM of 1 or more Brix in terms of sucrose,
a mass ratio of RebM/RebA of 2.5 or more,
RebM/sucrose in a ratio of Brix in terms of sucrose of 0.43 or more, and
one or more ingredients selected from plant extracts, caramel coloring, additional sweeteners, alcohol, flavoring agents, acidulants, colorants, milk products, and nutrient supplements,
in a liquid,
wherein the beverage has a surface tension of 20 to 90 mN/m.

20. The beverage according to claim 19, wherein the liquid is water, coffee, tea, fruit juice, or milk.

21. The beverage according to claim 19, wherein the beverage is a nonalcoholic beverage.

22. The beverage according to claim 19, wherein the beverage is an alcoholic beverage.

23. The beverage according to claim 19, wherein the beverage is a tea beverage, coffee beverage, fruit juice beverage, milk beverage, sports drink, cola, ginger ale, soda pop, or carbonated water provided with a fruit juice flavor.

24. The beverage according to claim 19, wherein the additional sweeteners are selected from aspartame, sucralose, and acesulfame K.

25. The beverage according to claim 19, wherein the acidulants are selected from citric acid, tartaric acid, malic acid, phosphoric acid, and lactic acid.

26. The beverage according to claim 19, wherein the nutrient supplements are selected from vitamins, minerals, and amino acids.

27. The beverage according to claim 19, wherein the one or more ingredients includes at least calcium.

28. A beverage, comprising:
Reb A,
Reb M,
a total content of RebA and RebM of 1 to 7.5 Brix in terms of sucrose,
a content of RebM of 1 or more Brix in terms of sucrose,
a mass ratio of RebM/RebA of 2.5 or more, and
RebM/sucrose in a ratio of Brix in terms of sucrose of 0.43 or more,
in a liquid;
wherein the beverage has a surface tension of 20 to 90 mN/m.

* * * * *